Aug. 24, 1926.  
J. J. JAKOWSKY  
1,597,277  
PROCESS AND APPARATUS FOR MANUFACTURE OF CARBON BLACK UNSATURATED GASES AND HYDROGEN  
Filed Nov. 10, 1922  
3 Sheets-Sheet 1

Inventor
Jay J. Jakowsky,
By Steward & McKay his Attorneys

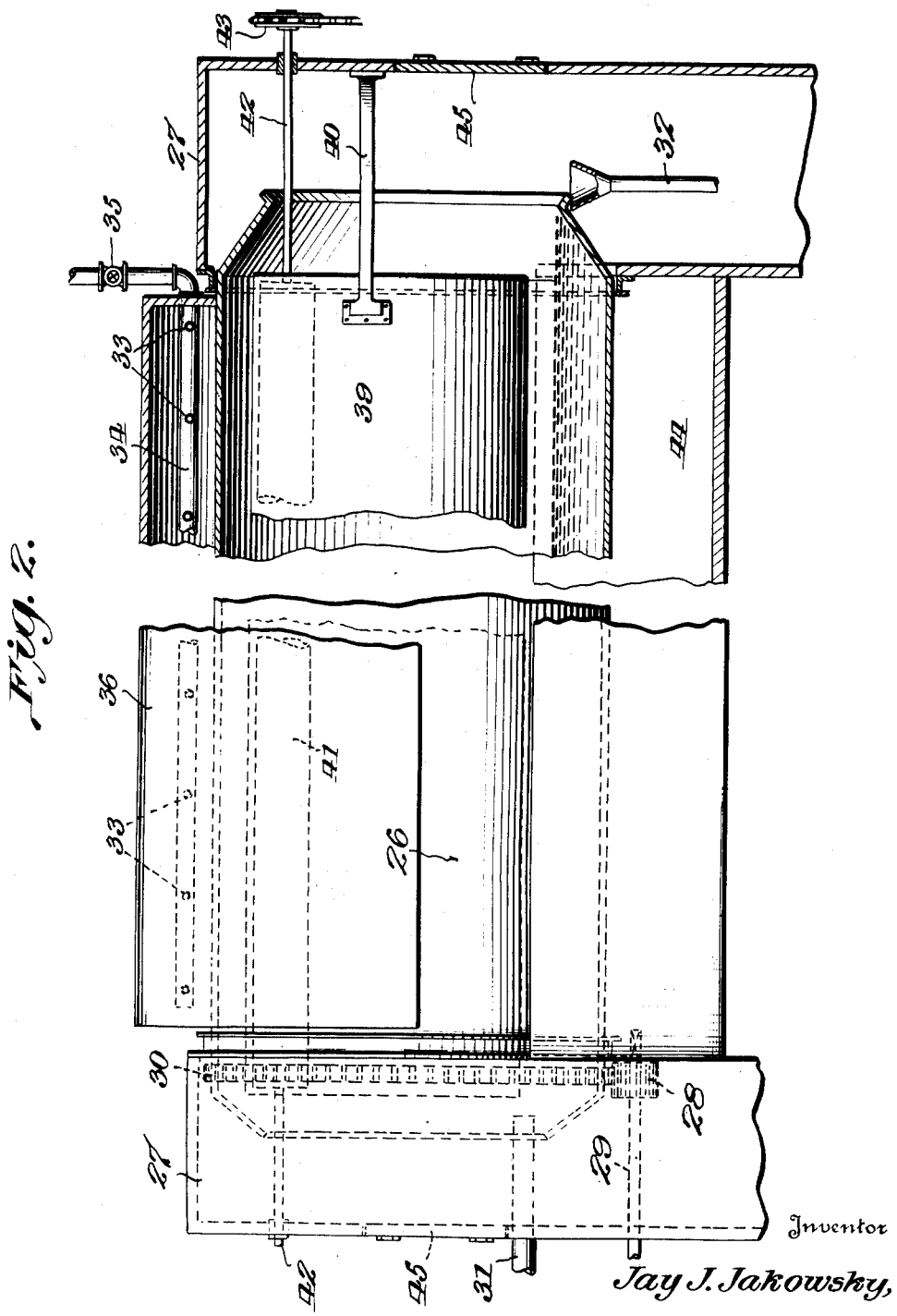

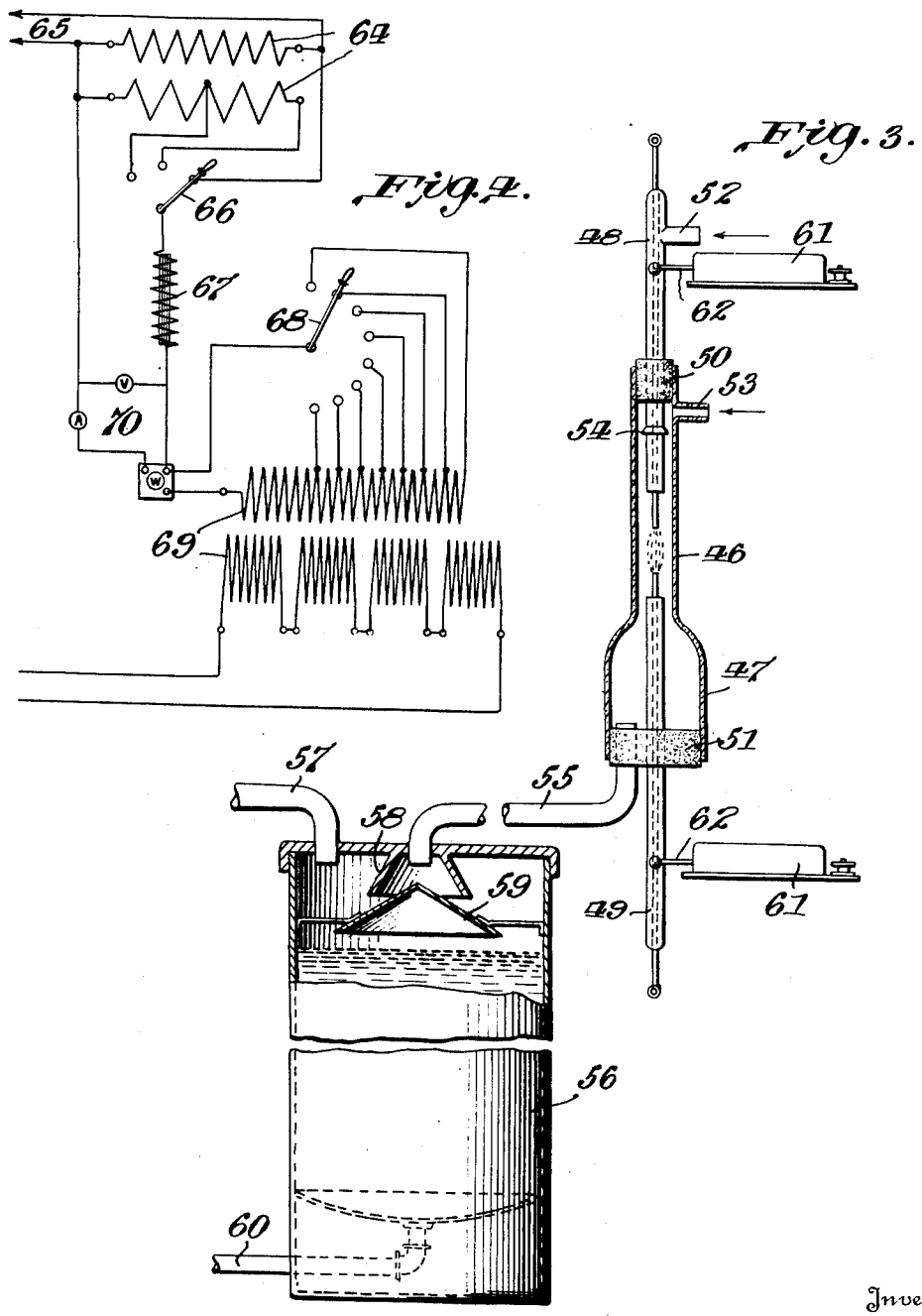

Patented Aug. 24, 1926.

1,597,277

UNITED STATES PATENT OFFICE.

JAY J. JAKOWSKY, OF LOS ANGELES, CALIFORNIA.

PROCESS AND APPARATUS FOR MANUFACTURE OF CARBON-BLACK UNSATURATED GASES AND HYDROGEN.

Application filed November 10, 1922. Serial No. 600,108.

The invention relates to the manufacture of hydrogen, unsaturated gases and carbon in the finely divided form and condition of purity commercially used as a pigment in paints and varnishes, in the manufacture of printers' ink and rubber tires, and for other purposes.

Carbon for the general uses referred to appears on the market in this country, as two distinct products under the general designations, carbon-black and lamp-black. Carbon-black, generally speaking, refers to the product resulting from decomposition of a hydrocarbon gas by incomplete combustion of the gas and as deposited by actual contact of a flame upon a metallic surface. The product, under the term carbon-black, is distinguished by its finely divided or flocculent state, deep velvety blackness, and great tinting strength, characteristics due to the very high percentage of pure carbon in an extremely finely divided condition and the absence in any substantial quantities of empyreumatic impurities.

Lamp-black, on the other hand, generally produced by incomplete combustion of a hydrocarbon oil, coal tar, resin or some other solid or liquid carbonaceous substance, is an inferior form of the product, having a gray tinge and less tinting strength. It usually contains naphthalene and other polymerization products, a gray amorphous form of carbon and particles of grit due to agglomerated carbon.

An understanding of the objects and principles of my invention can best be had after some consideration of prior methods of manufacture of carbon-black and the difficulties encountered therein.

The most generally employed and commercially successful prior methods of producing carbon-black, although differing in detail, all comprise, broadly stated, feeding a hydrocarbon gas to burners with an air supply insufficient for complete combustion and forming the carbon by direct contact of the resulting flame with a relatively cool metallic surface. The hydrocarbon employed is usually natural gas, the higher cost of artificial illuminating gas and other hydrocarbon gases preventing their use. Because of inherent difficulties in these manufacturing methods, extreme care is required to produce a product having the characteristics of carbon-black hereinbefore mentioned, and the yield is extremely low, averaging approximately one pound of carbon from an average content of thirty-five pounds per thousand feet of gas. Investigation of these methods indicates that the carbon collected is not the direct result of combustion of the hydrocarbon by union therewith of the oxygen supplied for combustion but is the direct result of the decomposition or dissociation into its constituent elements of the unburned portion of the hydrocarbon by the heat of the flame of the burning portion, the carbon-black being formed when the elemental carbon, freed during the decomposition process, is chilled rapidly by the metallic surface upon which it is deposited. In other words, by far the larger portion of the raw material used is consumed to heat the remainder to the temperature of dissociation of the carbon therefrom. In addition to this unproductive use of the raw material, a further waste arises from the escape upwardly in the flues around and beyond the depositing surfaces of a substantial portion of the unburned gas, from which carbon might otherwise have been obtained, due to drafts, weather conditions and other causes rendering it impossible to uniformly control the flame with respect to the depositing surfaces. It has further been found that if the carbon-black is permitted to remain upon the depositing surface in the presence of the heat which evolved it, agglomeration of its particles will occur or a change in character to the gray amorphous form of carbon, all detracting greatly from the commercial value of the product and in fact resulting in a product having the characteristics of lamp-black hereinbefore mentioned. To avoid these injurious results it has been customary to stop the process at intervals in order to scrape off the deposited carbon-black, or if the process is to be continuous, to employ mechanism providing a relative travel of the depositing surfaces and burners. While the quality of the product is thus improved, the first mentioned method results in a decreased output per unit of time and the second in an excessively expensive installation.

Attempts have also been made to overcome the difficulties mentioned by thermal decomposition of the gas without combustion. All such methods, although differing in detail, employ the common feature of a heating chamber or retort into which the gas is introduced and by which the gas is externally heated to the temperature of dissociation into its constituent elements. In some of such methods the carbon deposits upon the walls of the retort and the process is interrupted at intervals for its removal. In others, provision is made for the removal of the carbon from the dissociation zone by the outflowing stream of hydrogen or by other gases blown through the retort. In all of such methods, however, to obtain a maximum yield, a substantial charge of gas is employed in the retort, and this necessitates not only a large expenditure of heat energy but so prolonged a heat in order to extend the dissociation throughout the charge as apparently to injuriously affect a substantial proportion of the dissociated carbon and to produce polymerization products in the charge. At any rate, whatever the cause, authoritative reports (see Bulletin 192, U. S. Bureau of Mines, Carbon-black—its manufacture, properties and uses, pps. 36, 37, 49, published 1922, Government Printing Office) indicate that the processes referred to above of making carbon-black by thermal decomposition of a hydrocarbon gas have not met with success and that the product produced is grayish in color and in fact does contain naphthalene and other polymerization products, and possesses little tinting strength.

In addition to the difficulties in the production of carbon-black mentioned above, the decreased supplies of natural gas, the location remote from manufacturing centers and labor of many such supplies and legislation in many States against the wasteful use of the gas in the production of carbon-black, have seriously hampered the industry.

Attempts have heretofore been made to employ some readily available liquid hydrocarbon in the production of carbon-black, generally by vaporizing the hydrocarbon and passing the same through a retort heated to the dissociation temperature of the vapor and relying upon the outflowing stream of hydrogen to carry the evolved carbon beyond the heating zone. Such methods are substantially the same in principle as the methods, hereinbefore mentioned, of producing carbon-black from gas by its thermal decomposition in a heating chamber, and, so far as I am aware, have met with no greater success either in the quantity or quality of the product. Moreover, in many of these processes, due to the substantial pressures developed, an unduly expensive installation is required.

It is apparent from the foregoing brief résumé of the art, that one of the greatest difficulties encountered in the manufacture of carbon-black is the maintenance of a heating zone of sufficient intensity to dissociate the charge of hydrocarbon into its constituent elements while providing for the removal of carbon from that heating zone as the carbon forms during the dissociation process and without that delay which subjects the carbon to continued heating after its dissociation.

A primary object of my invention is to provide an improved process and apparatus for the production of carbon-black in high-yield quantity and at a low cost of apparatus-installation and operation.

Another object of my invention is to produce with the carbon-black hydrogen in a substantially pure state.

Still another object of my invention is the production of unsaturated gases, commercially valuable in certain industries, particularly in the manufacture of alcohol.

A further object of my invention is to produce as an additional or alternative product of the process and apparatus, carbon-black in an oily magma or mixture ready for use in certain industries, for example in the production of printing inks, paints and the like.

A still further object of my invention is to provide for the manufacture of any or all of the above-mentioned products from readily available compounds in gaseous or liquid form containing combined carbon and hydrogen and decomposable by thermal dissociation to yield the products referred to. In this specification, the term "carbon-hydrogen compounds" is used to designate compounds having the characteristics mentioned.

In practicing the invention with a gaseous carbon-hydrogen compound, I preferably employ natural gas as the compound or material to be dissociated. In practicing the invention with a liquid carbon-hydrogen compound an oil suitable for the production of carbon-black and the other products referred to may be used, such as coal tar distillates, petroleum hydrocarbons, or vegetable oils. I preferably employ a comparatively light oil such as kerosene distillate.

In one of its broad aspects, my invention contemplates a thermal decomposition of the gaseous or liquid carbon-hydrogen compound, that is, a dissociation into its constituent elements, in such immediate proximity to, or so in the presence of, a body of a cooling liquid that the evolved hydrogen and carbon are immediately received therein and thereby removed from continued exposure to the dissociating heat. When employing a gas as the material to be dissociated, an oil is preferably supplied as the cooling liquid. When dissociating an oil, a portion of the charge or body of oil undergoing treatment is maintained in a relatively cool condition and essentially below the temperature of the portion undergoing dissociation and hence itself provides the cooling liquid, and this constitutes a particular feature of my invention.

In its last mentioned feature, my invention contemplates the maintenance of a relatively restricted dissociating zone localized in a relatively cool body of the charge of oil. A circulation of the resulting products of dissociation away from the dissociating zone as fast as they are formed through the untreated portions of the charge which are below the dissociation temperature and of untreated portions of the charge into that zone is thereby set up. The main body of the charge itself thus provides the cooling medium into which the dissociation products are received as they are evolved, and thereby prevents that prolonged exposure of these products to the dissociating heat which causes agglomeration of the carbon and changes therein presenting an inferior product in the nature of lamp black. The process may be, and preferably is, made continuous by providing a suitable outlet and collecting means for the dissociation products and a suitable inlet and supply means for continuous renewals of the charge.

While my invention contemplates within its broad scope the employment of any heating means capable of maintaining a heating zone of sufficient intensity to dissociate the carbon-hydrogen compound employed, I have found certain advantages to inhere in the employment of the electric arc, and the use of such a dissociating agency constitutes a feature of my invention. Among such advantages, I have found that the evolved products of dissociation tend to retreat from the arc, thus enabling the process to be carried out in the case of the dissociation of a hydrocarbon gas, if desired, without the employment of a cooling liquid to receive the products of dissociation.

Preferably, a high voltage arc is employed, suitable electrodes being immersed in the body of the oil or extended into the gaseous charge in spaced relation to provide the arc required, and the current being supplied at a sufficiently high voltage and low amperage to provide the dissociating heat without decomposition of the electrode material.

When employing an oil as the charge, the invention also contemplates delivery of the hydrogen and unsaturated gaseous products through or in contact with the stream of oil flowing into the treating chamber to maintain the charge therein, thus providing a scrubbing action on the outflowing gases and a return to the treating chamber of any particles of carbon-black carried out in suspension in the outflowing gases. The major portion of the carbon-black, however, is not carried out with the outflowing gases but is immediately disseminated through the liquid body of the charge, and this carbon-black, together with that returned to the treating chamber from the outflowing gases, is ultimately delivered from the treating chamber intimately mixed with undissociated portions of the oil. The carbon is thus maintained by the oil in a soft finely divided state free from coking or agglomeration and in a condition to be readily extracted from the mixture by suitable means. Or, optionally, in the case of certain oils, particularly vegetable oils, the mixture of carbon and oil may be utilized without such extraction as a base for the production of printing inks, paints and the like, as the carbon pigment is in a fine state of division in a vehicle useful therewith for the purposes mentioned. These advantages may also be realized in the employment of a gaseous charge by delivering the carbon from the charge intermingled with the cooling oil employed.

The objects and principles of my invention, stated above, and other objects and principles, will more fully appear from a detailed description hereinafter to be given of illustrative embodiments of the novel apparatus in preferred forms, and of illustrative examples of the novel process. It is to be understood, however, that the embodiments and examples hereinafter described are merely illustrative of my invention and that the broad scope of the invention includes various other specific apparatus and processes in accordance with its principles and as defined in the appended claims.

The accompanying drawings illustrate two types of apparatus, one employing a liquid and the other a gas as the carbon-hydrogen compounds to be dissociated, built in accordance with the provisions of my invention and showing preferred embodiments thereof.

In the drawings:

Fig. 2 is a view partly in side elevation and partly in vertical longitudinal section of one of the apparatus elements shown in Fig. 1 and on an enlarged scale;

Fig. 3 is a view in vertical longitudinal section, with certain parts in elevation, of the apparatus employed in dissociating a gas; and Fig. 4 is a diagram of electrical apparatus and connections which may be used to supply the arc-producing current of high voltage and low amperage.

Figure 1:
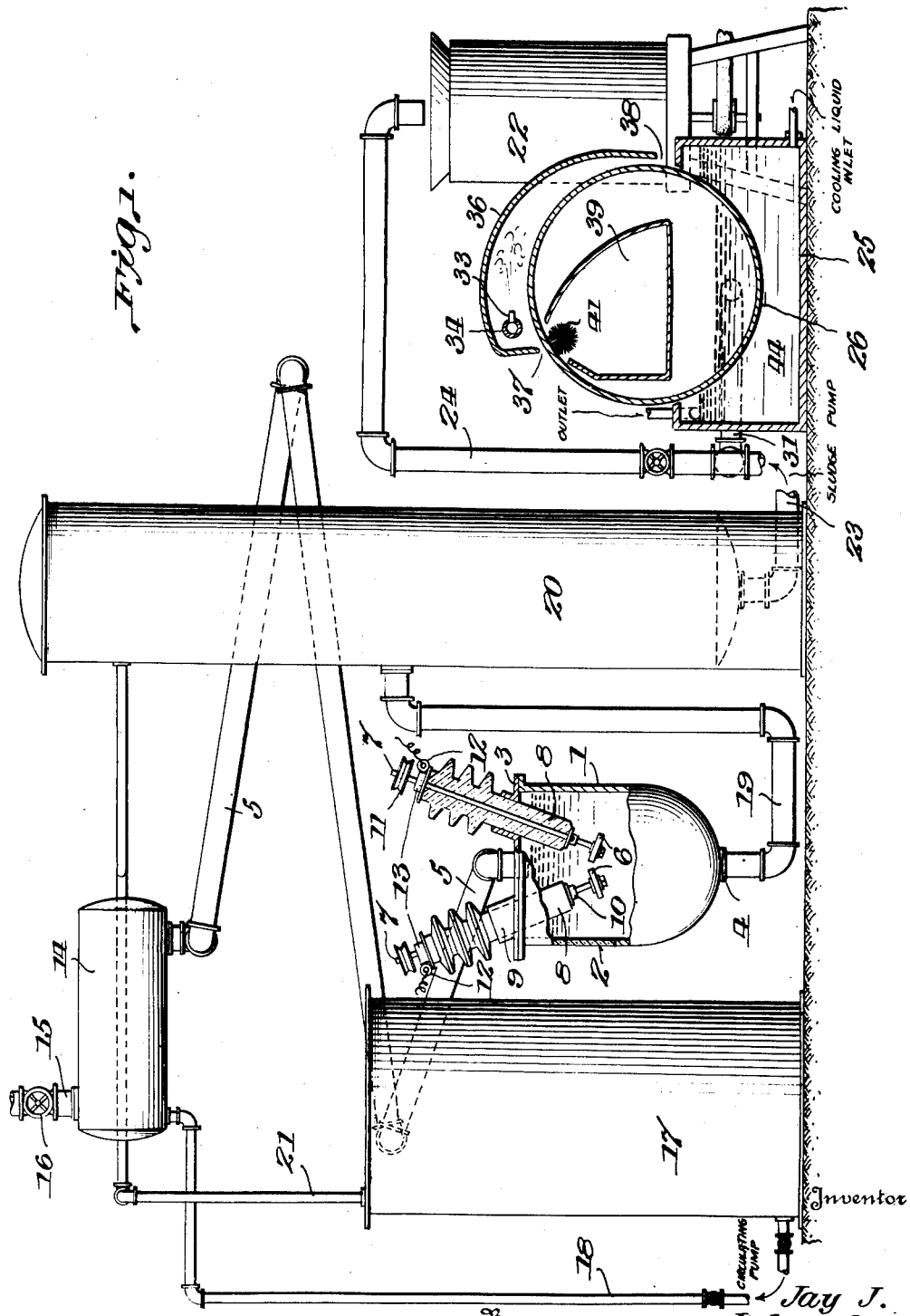
Fig. 1 is a more or less diagrammatic representation of the principal elements of the apparatus, employing a liquid carbon-hydrogen compound as the charge, in cooperative relation or working assembly, and showing the main apparatus parts in sectional views to clearly illustrate their respective functions in the installation.

In both the illustrative apparatus of Fig. 1 employing a liquid carbon-hydrogen compound as the charge and the illustrative apparatus of Fig. 3 employing a gaseous carbon-hydrogen compound a high voltage arc is employed as the dissociating agency, and electrodes of any suitable material not decomposed or volatilized by the arc employed may be used. I have found carbon or graphite electrodes well suited for the purpose, and I preferably employ carbon electrodes. Such electrodes of any suitable conformation and dimensions with their free inner terminals spaced within the charge to form the required arc therein may be employed. The diameter and spacing of the free inner terminals of these electrodes will, under well known principles, depend upon the extent and temperature of the arc desired. I have found that when employing a gaseous charge such as natural gas, an arc of approximately 1500° to 2000° Fahrenheit, and when emloying a relatively light oil such as crude petroleum distillate, an arc of approximately 2000° to 3000° Fahrenheit, give most advantageous results in the production of carbon-black and other desired products of dissociation.

The current should be supplied at a voltage high enough to initiate and maintain the arch through the body of the charge between the electrode terminals and at a current amperage sufficient to provide an arc of the required temperature but not at an amperage creating excess heat tending to volatilize the electrode material. As will be apparent, the voltage and current may be varied to meet the requirements in any given case.

In the illustrative apparatus shown in Fig. 1, and designed for an oil charge, a container 1 is provided for the oil. This container, which functions as an oil-treating chamber, may be of any suitable material and construction. It is shown as a metallic walled container provided with a window 2 of glass positioned to view the liquid level and the reactions taking place therein. A removable cover 3 closes the top of the chamber and its bottom is curved and provided with a centrally disposed outlet nipple 4 for delivery therethrough of the mixture of carbon-black and treated oil. The cover 3 is also centrally apertured for the insertion therethrough of a conduit 5, which, as will later be more fully set forth, functions as a scrubber for the gaseous products of dissociation and also as an inlet conduit for fresh supplies of the oil to maintain the charge. The conduit 5 preferably extends into the treating chamber a few inches to form a gas pocket at the top of the chamber to prevent the "bumping" which would otherwise occur during any irregular generation of gas in the treating chamber.

Under the broad principles of my invention hereinbefore mentioned as pertaining to the electrodes to be employed, I have found certain advantages to inhere, when treating a charge of oil, in the employment of electrode-means which will extend the initiated arc to the limits at which the arc can be maintained at the voltage and current employed and yet which will always present an initial gap within break-down distance through the oil to which the arc can return.

While various forms of electrodes, with or without associated arc-spreading means, may be used, I preferably employ disc electrodes rotating in the body of the oil forming the charge. In the illustrative apparatus, the electrodes consist of two opposed carbon discs 6, upon spindles 7, the spindles being preferably slightly inclined from the vertical in downwardly converging relation to oppositely incline the discs from the horizontal. The spindles 7 are journaled for rotation in insulating bushings 8 mounted in retaining sleeves 9 formed on the cover 3 of the oil-treating chamber. A suitable stuffing box 10 is provided at the lower end of each bushing and surrounding the electrode spindles to prevent leakage of oil. Pulleys 11, affixed to the outer ends of the spindles 7, which pulleys may be belt-driven in an obvious manner from any suitable power pulleys, impart rotary movement in opposite directions to the spindles and through them to the disc elecrodes 6. Electrical connection is made at the connectors 12, which are each provided with a brush 13 in rubbing contact with the electrode spindle.

In the illustrative example employing the illustrative apparatus charged with crude petroleum distillate, I preferably employ a sixty cycle alternating current of approximately .200 amperes at a voltage of approximately 4000, and find such a current supply to give excellent results.

The disc electrodes are spaced close enough to enable the voltage employed to start the arc or break down through the oil on the line of centers of the discs between the nearest adjacent points on their opposed peripheries. As soon as the arc starts, it drifts or travels due in part to the direction of movement of those portions of the electrode surfaces forming the gap and in part to the mechanical carrying effect of the swiftly flowing oil stream between the discs set up by their rotation. The arc is thus lengthened and drawn out from the position of its initial formation until its resistance increases to a point greater than that at which the arc can be maintained at the voltage and current flow employed, when the arc immediately recommences in its initial position at the line of centers of the discs.

The arc described provides an effective heat dissociating zone of a relatively restricted area localized within the comparatively large body of the liquid charge. Under normal conditions of operation, I have found that the main body of the liquid charge outside the restricted dissociating zone remains at a temperature below that of dissociation or the formation of empyreumatic matters injuriously affecting the product, although, if desired, cooling means may be employed, for example, a cooling jacket surrounding the oil-treating chamber.

The type of electrodes described is particularly effective in promoting the dissociating action. The rotating discs, forming the arc gap, keep the arc spread out and draw fresh supplies of oil continually thereinto. In addition, the rotation of the discs in the relatively cool body of the oil is of material assistance in keeping their temperature below their volatilization point. The type of electrodes employed is also an advantageous feature in operating the apparatus at maximum efficiency. My investigations indicate that the maximum efficiency of an apparatus of this character, for any specified voltage and current flow, is obtained when the gap length of the arc is the greatest; that is, when the greatest part of the total energy of the circuit is dissipated in the arc as heat. The spreading or extending arc with its correspondingly increasing resistance is therefore a particularly advantageous feature since upon the initial formation of the arc its resistance normally drops to a comparatively low value and unless the arc is extended and its resistance correspondingly increased the greatest dissipation of energy takes place in the circuit outside the arc, in the transformer employed or elsewhere, such dissipation representing waste energy so far as the decomposition of the oil is concerned. A further advantage of the extension of the arc beyond its initial formation is in the greater area of contact of the oil therewith.

Since the temperature gradient between the arc and the oil is very steep, the actual cracking or dissociation of the oil into its constituent element takes place only throughout a thin layer thereof immediately surrounding the arc. Because of the high temperature prevailing in the arc, the oil thus immediately surrounding the arc is dissociated into elemental carbon and hydrogen, some methane and lighter unsaturated gases being also formed.

The gaseous products of dissociation or decomposition of the oil move upwardly from the arc through the body of oil in the oil-treating chamber 1 and into the conduit 5 and upwardly therethrough into the header 14. A gas outlet conduit 15 delivers the gases from the header to suitable containers or apparatus for their use or further treatment. The conduit 5 between the oil-treating chamber 1 and the header 14 is of substantial length in the zig-zag formation shown to function as an outgoing gas scrubber and an incoming fresh oil supply, the outgoing gases traveling counter-current to the incoming fresh oil. The outgoing gases contain substantial quantities of carbon in suspension and thorough scrubbing is necessary to remove this carbon. Such scrubbing is attained by contact of the upflowing gases with the down-flowing oil in the counter-current scrubber 5, and the carbon is returned with the inflowing oil stream to the oil-treating chamber. A pressure valve 16 is provided in the gas outlet conduit 15 from the header 14, by which valve the system may be held under any pressure desired, holding the system under pressure giving a better scrubbing of the outgoing gases and also being beneficial in the treatment of the more volatile oils as it keeps them exposed to the action of the arc a longer period of time.

A supply tank 17 is provided for the fresh oil to maintain the charge. A circulating pump, indicated by legend on the drawings, of any suitable type, is employed to deliver the fresh oil from the supply tank 17 through the oil conduit 18 to the header 14. From the header 14 the oil supplied thereto flows downwardly through the counter-current scrubber 5 to the oil-treating chamber 1 in the manner already stated.

The main body of the oil surrounding the dissociating zone formed by the arc immediately receives therefrom the continuously evolved products of dissociation including the carbon particles, and this body of liquid, by reason of its relatively low temperature, prevents coking, agglomeration or polymerization of the carbon. In addition, the carbon particles being at once absorbed by the oily vehicle are maintained in the desired finely divided or flocculent state.

The mixture of treated oil and carbon in finely divided condition in suspension therein flows from the oil-treating chamber through the conduit 19 into the settling tank 20. As the run of the process continues, a substantial quantity of the mixture of oil and carbon accumulates in the settling tank, the particles of carbon, still suspended in the oil, gradually settle to the bottom of the tank as a relatively thick sludge, leaving an upper stratum of substantially carbon-free oil. The free oil is returned to the oil supply tank 17 by way of the overflow or return pipe 21, to repeat its cycle of operation.

The carbon may be separated from the sludge in the form of a carbon-black alone, or a paste of carbon-black and oil, useful in the paint and pigment trade, produced from the sludge. My invention contemplates both products.

The carbon may be separated from the oily mixture or sludge in a number of different ways. For example, the sludge may be centrifuged to remove as much of the oil as possible by such mechanical means, then washed with a solvent oil such as gasoline or acetone, and the carbon filtered out and dried to remove any residuum of the solvent oil. The carbon, although appearing in lumps from the drying, is essentially of the characteristics of carbon-black and readily broken or disintegrated into its finely divided form. A centrifuge machine which may be thus employed is indicated generally at 22 in Fig. 1 and the sludge is delivered thereto by a pump, indicated by the legend "Sludge pump" on the drawings, of any suitable type, through the conduit 23 extending from the bottom of the settling tank to the pump and the conduit 24 extending from the pump to the centrifuge machine.

While in the production of carbon-black, the carbon may be separated from the oily mixture or sludge in a number of different ways, one of which, employing the centrifuge machine, has already been given by way of example, my invention contemplates a preferred form of apparatus, for this purpose, indicated generally at 25 in Fig. 1, and shown in greater detail and on an enlarged scale in Fig. 2. This apparatus, conveniently termed a drier, consists essentially of a horizontally disposed, slowly rotating drum, preferably about fifty feet in length, arranged to receive the oily mixture or sludge into its interior and to spread the same upon its inner walls in its rotation, means to heat the upper presentation of the drum wall above the body of the sludge to evaporate and drive off the oil from the spread thereon and means to remove the remaining carbon. The drum is indicated at 26 rotatably mounted in end housings 27. A pinion 28 upon a shaft 29 journaled in one of the housings (the left hand housing as viewed in Fig. 2) and coacting with a gear 30 surrounding the drum adjacent its end in that housing, serves to drive the drum in slow rotation. The ends of the drum are inwardly inclined as shown in Fig. 2 to provide for the retention in the bottom of the drum of a body of the oily mixture or sludge. A conduit 31 connected to the outgoing conduit 24 of the sludge pump delivers the sludge to the drum. An oil drain 32 is disposed adjacent the opposite end wall of the drum from which the oil may be returned to the main oil supply tank if desired.

The means for heating the upper presentation of the rotating drum wall above the body of the sludge comprises burners 33 disposed in a series above the crown of the drum and longitudinally thereof and each directed to extend a heating flame transversely across the upper exterior surface of the drum, as indicated in Fig. 1. These burners may be of any ordinary type to which a combustible such as a hydrocarbon gas and air are supplied, the gas supply pipe being indicated at 34, and the gas supply being controlled by a valve 35. A hood 36 is mounted over the upper portion of the drum and over the gas supply pipe and burners. As shown in Fig. 1, the hood is spaced from the upper surface of the drum to provide on one side of the burners an air entrance 37 and on the opposite side an exit 38 for the products of combustion. As also shown in Fig. 1, while the hood conforms generally to the contour of the upper surface of the drum, its wall is curved to provide a decreasing space toward the exit 38 so as to deflect the heat from the burners downwardly upon the drum.

A carbon collecting chamber 39 is mounted in fixed position within the rotating walls of the drum in any suitable manner, for example by supporting brackets 40 extending from the housings 27. The carbon collecting chamber has a lower flat wall or floor and two opposite side walls curving upwardly therefrom in decreasing spaced relation to the interior wall of the drum to terminations forming a slot-like opening or entrance to the chamber extending longitudinally of and closely adjacent the drum wall. In this opening a rotatable brush 41, having a cylindrical brush surface, is mounted upon a brush spindle 42 so as to extend longitudinally of the internal wall of the drum and in brushing contact therewith. The brush spindle 42 is journaled in the opposite housings 27 as indicated in Fig. 2, and is designed to impart rotation to the brush at a greater peripheral speed than that of the drum by any suitable means, for example by the sprocket and chain drive indicated at 43, Fig. 2.

It is highly desirable that the heat be applied only to the thin spread of the oily mixture or sludge upon the interior of the drum and that the body of the sludge in the bottom of the drum be maintained in a relatively cool state. Accordingly, a cooling jacket 44 is provided in the lowermost path of travel of the drum, with inlet and outlet piping, as shown in Fig. 1, for the circulation of water or other cooling medium.

In the operation of the drier, a body of the oily mixture or sludge is maintained in the lower portion of the drum, as indicated in Figs. 1 and 2. The drum is slowly rotated in the direction of the arrow in Fig. 1, and the drum wall advancing out of the sludge retains thereon a thin spread of the mixture, which it carries through the heating zone of successively increasing temperatures created by the burners. During such advance the oil by degrees is driven from the mixture by the vaporizing heat until by the time the spread reaches the rotating brush substantially all the oil has been driven off leaving a residuum of finely divided carbon upon the advancing wall. The rotating brush removes this carbon and deposits it within the collecting chamber 39. Doors, indicated in dotted line and in section at 45 in Fig. 2, are provided in the end housings 27 to provide access to the chamber 39 for removal of the collected carbon. The carbon collected is found to be in finely divided condition, of a high degree of purity and freedom from empyreumatic matters, and in fact having the characteristics of carbon-black.

The gaseous products of the process passing out from the apparatus through the gas outlet conduit 15, Fig. 1, are found to be hydrogen together with some methane and a substantial quantity of unsaturated gases, generally amounting to ten per cent or more of the total gas volume depending upon the grade of oil being treated and the amperage flow of current employed in the arc. Generally speaking, the heavier the molecular weight of the oil and the greater the amperage flow of current and consequently the hotter the arc, the greater the percentage production of the unsaturated gases. These gases from the gas outlet of the apparatus may be run through sulphuric acid scrubbers for the removal of the unsaturates, thence through water scrubbers to remove acid spray, and thence to gasometers for use of the remaining hydrogen. The methane is found to be present with the hydrogen in such an extremely small percentage quantity as not to be detrimental in the majority of uses for which hydrogen is employed, although, if desired, the methane may be removed by compression and condensation or other well known methods.

The unsaturated gases recovered are commercially valuable in certain industries, including particularly, the manufacture of alcohol.

The paste of carbon-black and oil referred to as an alternative or additional product of my invention may be produced by the removal of the excess oil in the sludge by any suitable means. Desirably, the centrifuge machine hereinbefore referred to and indicated at 22 in Fig. 1, is employed for this purpose also. The paste thus formed will, of course, contain a certain amount of the original oil from which the carbon was produced, and the availability of the paste for pigment uses will depend upon whether the original oil has the properties also required for such use. In the illustrative apparatus, as already stated, I preferably employ a crude petroleum distillate, such as kerosene. For many pigment uses a small amount of this oil will not be detrimental. For the manufacture of printers' ink and for other special purposes, however, even a small amount of this oil would be detrimental. When producing the carbon-black from such an oil, the original detrimental oil can, of course, first be removed by any of the methods hereinbefore referred to and the desired oil thereafter added to the carbon-black to form the required paste. My invention contemplates, however, the production of the carbon-black paste in the desired base oil without the necessity of first removing the original oil. Any base oil having the desired properties and a boiling point higher than that of the original oil which is to be removed, may be employed. I preferably employ linseed-oil. The linseed oil is added to the sludge coming from the settling chamber, the carbon-kerosene-linseed-oil mixture is then placed in a still and the kerosene distilled off. The linseed oil keeps the carbon-black from coking during the distilling process and the result is a carbon-black in the desired base oil.

Or, if desired, the base oil may be mixed with the raw oil in the charge to be decomposed for the production of the carbon-black and the resulting mixture distilled as before to remove the objectionable oil. While by this method, some of the desired and generally more expensive base oil is itself decomposed during the treating process, the waste and increased expense is not excessive due to the fact that the amount of base oil required in the formation of the paste is relatively small.

The apparatus shown in Fig. 3 is employed in the production of carbon-black from a gaseous carbon-hydrogen compound, such, for example, as natural gas, and in such use it takes the place of the oil-treating chamber shown in Fig. 1. The treating chamber, in this apparatus, is formed, preferably, with thick walls of a heat resisting glass such as pyrex glass, and of bottle-shape providing an upper relatively extended and narrow neck portion 46 forming the reaction space or chamber and an enlarged lower body portion 47 forming the collecting chamber. The electrodes preferably employed in the treatment of the gaseous charge are non-rotating carbon rods and are mounted in the outer closed ends of pyrex tubes 48 and 49. These tubes extend through the rubber stoppers or plugs 50 and 51 fitted in the respective upper and lower open ends of the treating chamber, and the electrodes, of smaller diameter than the bore of the tubes, extend therethrough and beyond the inner open ends of the tubes to opposed free terminals within the neck portion of the chamber. A gas inlet tube 52 extends through the cylindrical wall of the upper tube 48 adjacent its outer end to provide a gas supply through the space of annular cross section between the upper electrode and its surrounding tube, the gas stream thus traveling longitudinally of the upper electrode and directly into the arc.

An inlet 53 to the interior of the treating chamber adjacent its upper end and above the opposed electrode terminals is provided for the supply of a cooling and washing liquid, such as oil or water. Immediately below the inlet an annular outwardly flaring skirt 54 is mounted or formed upon the upper gas-supplying and electrode-supporting tube, in position to direct or spread the stream of liquid supplied thereabove outwardly to the walls of the treating chamber. The oil or water is supplied in sufficient volume and is so directed or spread as to form a continuous liquid body or wall about the electrodes, and because of the narrowness of the reaction space of the chamber about the electrode terminals, this body or wall of liquid is in immediate surrounding proximity to the electrode terminals and the arc maintained therebetween. The incoming stream of gas is compelled therefore by the confining liquid wall to pass through the arc.

The arc is maintained at high voltage and low amperage flow of current as hereinbefore stated and the dissociation products, in this case carbon and hydrogen with unsaturated gases and a very small quantity of methane, emerge from the arc into intermingling contact with and passage through the body or wall of liquid referred to. The intermingled liquid, carbon and gases advance downwardly into the larger portion 47 of the chamber, more or less accumulate therein, and are delivered therefrom through the exit conduit 55.

Preferably an oil is employed as the cooling and washing liquid, and when so employed, the mixture of oil and carbon is substantially the same in character as that derived from the oil-treating chamber 1 of the apparatus shown in Fig. 1, and is subject to the same treatment for removing the carbon-black therefrom or for forming a paste of carbon-black and oil.

A settling tank 56 is employed of substantially the same construction and for substantially the same purpose as the settling tank hereinbefore described in connection with the oil-treating apparatus, except that in the present apparatus the gases are delivered thereto through the conduit 55 along with the mixture of carbon and oil. Suitable means are provided in the settling tank for separating the oil and carbon from the gases and for delivering the latter from the tank leaving the former therein. Such means may, and preferably does, as shown, take the form of a gas outlet conduit 57 spaced from the delivery spout of the conduit 55, a baffle 58 with an annular flared wall depending from the top of the settling tank, surrounding the delivery spout of the conduit 55 and between that spout and the gas outlet conduit 57, and a cone shaped baffle 59 immediately below the baffle 58. This arrangement causes a sharp deflection of the inflowing gases from their downward inflow to their upward outflow, resulting in a substantially complete delivery therefrom in a downward direction over the lower baffle surface of the heavier oil and carbon. The mixture of oil and carbon or sludge is delivered from the lower portion of the tank through the conduit 60 for further treatment for the removal of the carbon-black therefrom or the formation of a paste of carbon-black and oil, as in the first described apparatus.

In the type of apparatus shown in Fig. 3, to remove any possible deposits of carbon from the electrode tubes or electrodes, I preferably employ vibrators with the vibrating arm or element in tapping engagement with the electrode tubes. These vibrators may be of any suitable type. I have found large type electric bells with the gong removed and the strikers functioning as the vibrating element to give satisfactory results, and two such vibrators are indicated generally at 61 and the vibrating arm or element at 62 in tapping engagement with the electrode tubes.

Any suitable electrical equipment may be employed with either apparatus to maintain the arc in the manner stated. One such equipment is diagrammatically shown in Fig. 4. The equipment consists essentially of a 15 KVA step-down transformer 64 with input current wires 65, voltage switch 66 (120, 220 and 440 volts), adjustable impedance coil 67, primary switch 68 controlling taps on the primary of a 1C KVA step-up transformer 69, and meters 70 as indicated. The secondary of the step-up transformer is constructed, as shown in Fig. 4 allowing the coils to be connected in series, series-multiple or multiple, and providing, in connection with the voltage regulation on the primary circuit, any voltage from 2000 to as high as 150,000 volts.

The terms "dissociation", "dissociate", "decomposition" and "decompose" as used throughout the foregoing specification and in the appended claims, are not to be understood as limited in meaning to a complete break-down into their constituent elements of all molecules of the carbon-hydrogen compound subjected to the dissociation or decomposition referred to. The dissociating or decomposing agency maintains a sufficient temperature to produce that whole or partial break-down of the particular carbon-hydrogen compound employed necessary to evolve the carbon, hydrogen and unsaturated gases desired; and the degree of break-down may vary according to the carbon-hydrogen compounds employed or the particular products desired. In the treatment of a gaseous carbon-hydrogen compound such as natural gas, the dissociation may extend to a complete or nearly complete break-down of the molecules into their constituent elements of carbon and hydrogen. In the treatment of an oil, particularly when a substantial amount of unsaturated gases are produced, the dissociation may mean but a partial break-down of certain portions or molecules of the oil, with a resulting evolution of carbon and hydrogen and a residual formation of simpler carbon-hydrogen compounds evolving as the unsaturated products referred to.

What I claim is:

1. The process of producing carbon-black comprising introducing a carbon-hydrogen compound into a heating zone maintained by suitable heat producing means at a temperature sufficient to evolve carbon and hydrogen by dissociation of said compound, maintaining in surrounding proximity to said zone a supply of a cooling liquid and withdrawing the carbon and hydrogen products of dissociation from said heating zone through said liquid.

2. The process of producing carbon-black and hydrogen which comprises exposing a carbon-hydrogen compound in a heating zone maintained at a temperature sufficient to dissociate the compound into its constituent elements and directing the hydrogen and carbon resulting from such dissociation from said heating zone immediately through a relatively cool liquid body and separating and collecting the carbon and hydrogen.

3. The process of producing carbon-black which comprises exposing a carbon-hydrogen compound in a heating zone to a temperature sufficient to dissociate the compound and liberate free carbon therefrom and immediately directing the dissociated carbon away from said heating zone directly into a relatively cool liquid body and then collecting the carbon directly from said liquid body at a point beyond said heating zone.

4. The process of producing carbon-black comprising dissociating a carbon-hydrogen compound into its constituent elements by a high voltage electric arc and maintaining a flowing body of liquid in such proximity to said arc as to withdraw therefrom the products of dissociation and separating the carbon-black from said liquid.

5. The process of producing carbon-black from a liquid carbon-hydrogen compound comprising dissociating the compound in a zone maintained by suitable means at high temperature and maintaining in immediate proximity to said zone a supply of said liquid compound at a relatively low temperature to effect a transfer of dissociated carbon from said heating zone immediately to said liquid supply, and separating and collecting said dissociated carbon directly from said supply.

6. The process of producing a paste of carbon-black and oil comprising exposing a charge of oil to heat sufficient to dissociate only a portion thereof into its constituent elements of carbon and hydrogen, withdrawing the formed hydrogen, and centrifuging the mixture of carbon and oil.

7. The process of producing carbon-black and hydrogen comprising maintaining within a body of liquid carbon-hydrogen compound a heating zone of sufficiently high temperature to set up a reaction of dissociation within said body of carbon and hydrogen and of sufficiently restricted extent to confine said reaction to a small portion of said body of liquid while presenting the larger surrounding portion of said liquid body in a relatively cool condition substantially below the dissociation temperature, maintaining the freed carbon in suspension in said liquid body and removing directly from said liquid body the suspended carbon and hydrogen thus formed.

8. The process of producing a paste of carbon-black and oil comprising maintaining within a body of an oil a heating zone of sufficiently restricted extent and high temperature to set up a local reaction of dissociation within said body of oil, removing the formed carbon and oil in intermingled condition, and centrifuging the mixture.

9. The process of producing carbon-black in an oily vehicle or mixture useful in the preparation of printing inks, paints and the like, comprising maintaining in a suitable chamber a charge of oil, maintaining within the body of said charge of oil a heating zone of sufficiently restricted extent and high temperature to set up a local reaction of dissociation within said body of oil and liberation of carbon in finely divided condition into the body of said oil in suspension therein and removing oil with said suspended carbon therein directly from said charge of oil in said chamber.

10. The process of producing carbon-black comprising maintaining within a body of an oil an electric arc between opposed electrodes with the arc of sufficiently restricted extent and high temperature to effect a local reaction only within said body of oil of dissociation of the hydrocarbon and liberation of free carbon in finely divided condition into the surrounding body of the oil in suspension therein and removing directly from the body of the oil at points removed from said arc and from said electrodes, the carbon black suspended in said oil.

11. The process of producing carbon-black from an oil comprising supplying a body of the oil in a suitable container, liberating free carbon in suspension in said body of oil by dissociating portions of said body of oil by a high voltage electric discharge therethrough, producing a flow of oil with said suspended carbon therein from said container, centrifuging the mixture of oil and carbon to remove excess oil therefrom and then removing the remaining oil by evaporation or otherwise.

12. The process of producing a paste of carbon-black and oil useful in printing inks, paints and the like comprising supplying a body of the oil, dissociating portions thereof by a high voltage electric discharge therethrough, and centrifuging the mixture of carbon and oil.

13. The process of producing carbon-black comprising supplying to a suitable container a charge of an oil, maintaining a relatively small portion of the oil localized within the charge at the temperature of dissociation into its constituent elements and the surrounding body of the charge in a relatively cool condition and essentially below the dissociation temperature, whereby the products of dissociation are disseminated to said surrounding body of the charge, and withdrawing and separating said products from the charge.

14. The process of producing a mixture of carbon-black and a desired base oil suitable for use in the manufacture of printing inks, paints and the like comprising adding to a mixture of carbon-black and a residuum portion of a hydrocarbon oil resulting from the formation of the carbon-black by dissociation of said hydrocarbon oil a desired base oil of higher boiling point than said residuum portion of said hydrocarbon oil and distilling from the total mixture said residuum portion of said hydrocarbon oil.

15. The process of producing a mixture of carbon-black and a desired base oil suitable for use in the manufacture of printing inks, paints and the like comprising forming the carbon-black in a charge of hydrocarbon oil by thermal dissociation of portions of said charge, withdrawing a mixture of carbon-black and undissociated hydrocarbon oil from said charge, adding to said mixture a desired base oil having a higher boiling point than said hydrocarbon oil and distilling said hydrocarbon oil from said mixture.

16. The process of producing an unsaturated carbon-hydrogen compound from a fluent saturated carbon-hydrogen compound comprising maintaining a high voltage electric arc, producing a body flow of the carbon-hydrogen compound through said arc, and collecting the unsaturated products of dissociation from the body of carbon-hydrogen compound.

17. The process of producing carbon black from a fluent carbon-hydrogen compound comprising maintaining an electric arc of sufficient heat production to dissociate portions of said carbon-hydrogen compound in contact with said arc into carbon black and other products, producing a body flow of the carbon-hydrogen compound through said arc, and collecting the carbon black from the body of the carbon-hydrogen compound after its passage through said arc.

18. An apparatus for producing carbon-black, hydrogen and unsaturated gases comprising, in combination, a container for an oil, means for maintaining a supply of said oil therein, means for creating and maintaining a high voltage arc within the body of said oil, means creating a flow from said arc through and from the body of said oil of evolved hydrogen, unsaturated gases and carbon, and means for collecting said products.

19. An apparatus for producing carbon-black comprising, in combination, a container for an oil, means for maintaining a supply of said oil therein, means creating and maintaining a high voltage low amperage arc within the body of said oil, said means including means automatically operating to extend the arc beyond its initial formation to the limits at which the arc can be maintained at the voltage and current employed.

20. An apparatus for producing dissociation products from an oil comprising, in combination, a container for the oil, means for maintaining a supply of said oil therein, opposed constantly rotating disc electrodes wholly immersed in said oil in said chamber, a current suppy to said electrodes, and outlet means for dissociation products of said oil.

21. An apparatus for producing carbon-black comprising, in combination, a container for an oil, means for maintaining a supply of said oil therein, constantly opposed rotating disc electrodes wholly immersed in said oil in said chamber, a high voltage current supply to said electrodes, and means for withdrawing carbon-black from said oil.

22. An apparatus installation for production of carbon-black comprising, in combination, an oil-treating chamber, means for supplying a charge of oil thereto, dissociating means forming free hydrogen and carbon in said charge, conduit-means for delivering commingled carbon and oil from said charge, and a drier receiving intermingled carbon and oil and arranged to evaporate the oil therefrom.

23. The process of producing carbon-black and other products comprising introducing a carbon-hydrogen compound into a heating zone maintained by suitable heat producing means at a temperature sufficient to evolve simpler carbon-hydrogen compounds, and free carbon and hydrogen by dissociation of said compound, maintaining in surrounding proximity to said zone a supply of a cooling liquid and withdrawing the carbon-hydrogen and free carbon and hydrogen products of dissociation from said heating zone through said liquid.

24. The process of producing carbon-black comprising introducing a carbon-hydrogen compound into a heating zone maintained by suitable heat-producing means at a temperature sufficient to evolve free carbon by dissociation of said compound, maintaining in surrounding proximity to said zone a supply of a cooling liquid and withdrawing the free carbon product of dissociation from said heating zone through said liquid.

25. The process of producing carbon-black comprising supplying to a suitable container a charge of an oil, maintaining within said charge a heating zone of sufficiently restricted extent and high temperature to set up a local reaction of dissociation of oil within said charge, creating currents in said charge of oil of dissociation products away from said zone and of undissociated oil to said zone, and removing the dissociation products from said charge.

In testimony whereof I hereunto affix my signature.

JAY J. JAKOWSKY.